July 12, 1966 M. YOUNG 3,260,941

EUROPEAN TYPE OF TELEPHONE INSTRUMENT FITTED WITH TRANSISTORIZED RADIO RECEIVER

Filed Dec. 9, 1963 3 Sheets-Sheet 1

MICHAEL YOUNG
INVENTOR.

BY

ATTORNEY

MICHAEL YOUNG
INVENTOR.

BY [signature]
ATTORNEY

July 12, 1966 M. YOUNG 3,260,941

EUROPEAN TYPE OF TELEPHONE INSTRUMENT FITTED WITH TRANSISTORIZED RADIO RECEIVER

Filed Dec. 9, 1963 3 Sheets-Sheet 3

MICHAEL YOUNG
INVENTOR.

BY

ATTORNEY

United States Patent Office 3,260,941

Patented July 12, 1966

3,260,941
EUROPEAN TYPE OF TELEPHONE INSTRUMENT FITTED WITH TRANSISTORIZED RADIO RECEIVER

Michael Young, 142 E. 33rd St., New York, N.Y.

Filed Dec. 9, 1963, Ser. No. 328,885
2 Claims. (Cl. 325—310)

This invention relates to a combination consisting of a simulated telephone instrument fitted with a transistorized radio receiver, and is particularly directed to a European, or French type of telephone instrument, with a transistorized radio receiver fitted to the interior of the base thereof.

The primary object of the invention is to provide a radio receiver, which is mounted in a simulated foreign type of telephone instrument in such a manner that when the handset is lifted from the telephone instrument, it controls the operation of the radio receiver.

Another object is to provide a simulated foreign type of telephone instrument fitted with a rotatable dial, which is similar in appearance to the conventional telephone dial, the dial serving as a station selector for the radio receiver.

Another object is to provide a simulated foreign type of telephone instrument fitted with a small transistorized radio receiver, the receiver being so mounted relative to the simulated telephone instrument, that it is completely hidden from view when the radio receiver is in use.

A primary feature of the invention is that a switch which controls the operation of the radio receiver is mounted within the support for the handset portion of the simulated telephone instrument in such a manner that when the handset is lifted in the conventional manner it automatically controls the operation of the radio receiver.

Another feature is that the external appearance of the combination simulates a European type of telephone instrument, and in particular, what is known as a "French" type of telephone instrument.

Another feature is that the radio receiver is so mounted within the base of the telephone instrument that it can readily be removed and replaced for repairs or other purposes.

Another feature is that a volume control knob is provided outside one wall of the base of the simulated telephone instrument to enable the operator to control the volume of the sound emanating from the radio receiver.

Another feature is that the speakers are mounted within the interior of the cylindrical ends of the handset of the simulated telephone instrument, in the cylindrical ends of said handset, which are nominally occupied by the mouthpiece and the receiver portion of the handset, so that the outward appearance of the handset is substantially the same as that of the conventional "French" type of telephone instrument.

By providing speakers in the handset of the telephone instrument, the volume of the radio receiver is expanded to such an extent that the radio receiver can readily be heard without the use of earphones.

Another feature is that all electrical connections to the radio receiver are mounted in the interior of the base of the simulated telephone instrument, except the flexible connection between the handset and the base of the instrument, which is substantially the same as the normal flexible connection or cord fitted between the handset and the base of the instrument, thus preserving the outward appearance of the conventional "French" type of telephone instrument.

The accompanying drawings, illustrative of one embodiment of the invention, together with the description of its construction and the method of operation, mounting and utilization thereof, will serve to clarify further objects and advantages of the invention.

In the drawings:

FIG. 1 is a vertical section through the base of the simulated telephone instrument, shown in FIG. 4, showing the transistorized radio receiver mounted in the base of the simulated telephone instrument, the station selector dial located adjacent one face of a portion of the forward wall of the base, and the means for connecting the dial with the station selector shaft which projects beyond one wall of the case of the radio receiver.

Figure 2:
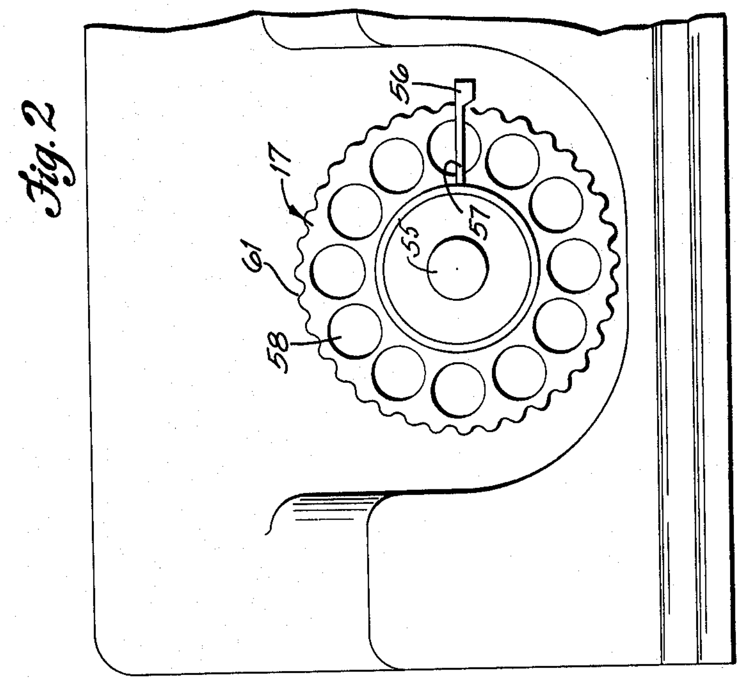
FIG. 2 is an angular front elevational view of a portion of the simulated telephone instrument, shown in FIGS. 1 and 4, showing the station selector dial, the view being taken on the line 2—2, FIG. 1.

It will be understood that the following description of the construction and the method of operation and utilization of the European type of telephone instrument fitted with transistorized radio receiver, is intended as explanatory of the invention and not restrictive thereof.

In the drawings, the same reference numerals designate the same parts throughout the various views, except where otherwise indicated.

Figure 1:
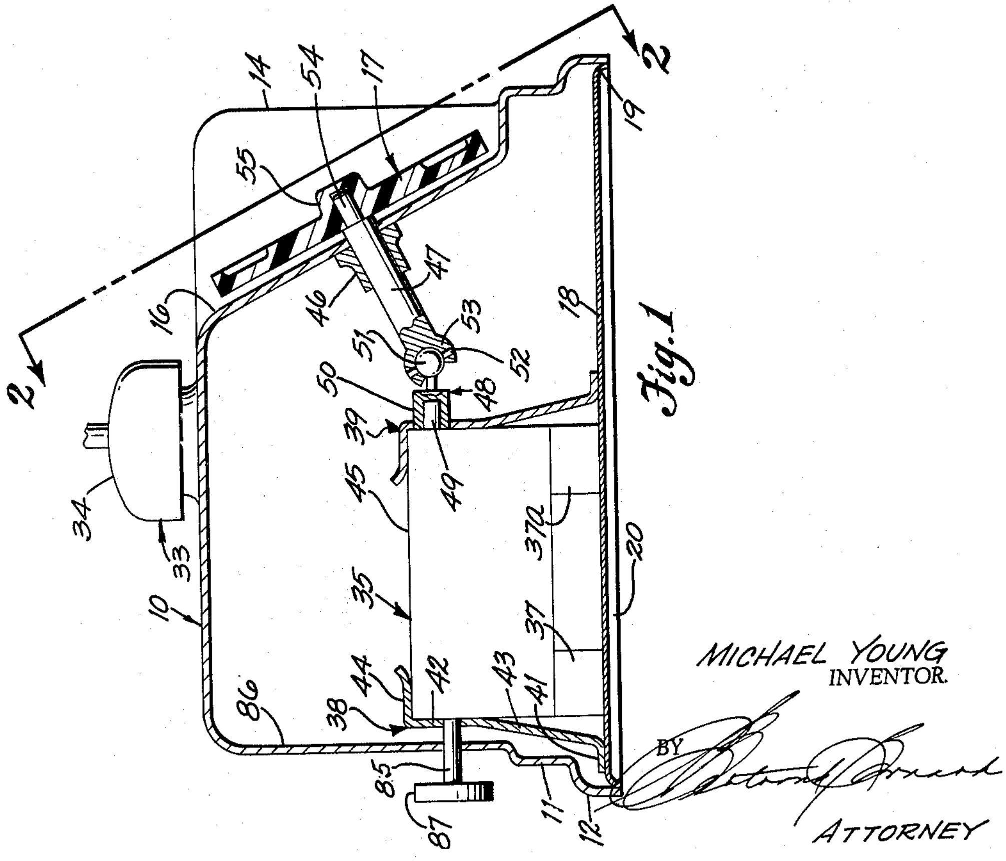
Figures 3, 4:
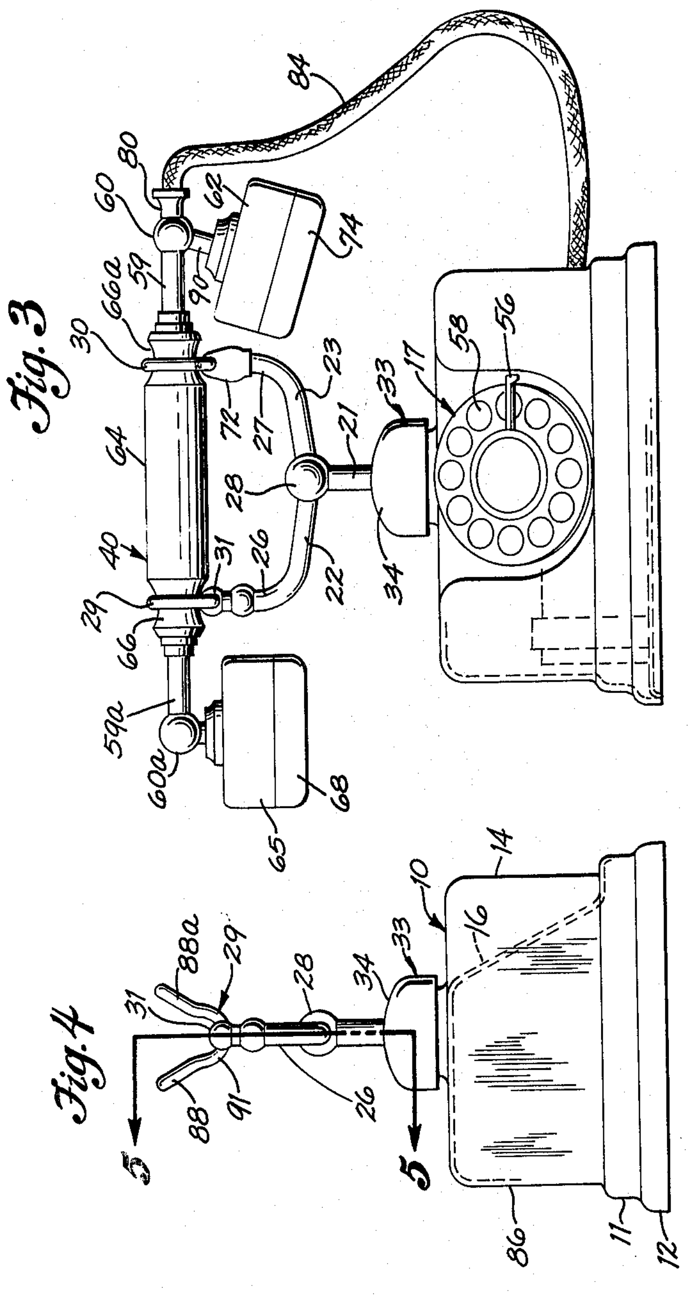
FIG. 3 is a front elevational view of the assembled simulated telephone instrument, shown in FIGS. 1 and 4, showing the base, the bandset support bracket attached to the base, with the handset in place and the flexible cord connecting the handset to the base of the simulated telephone instrument.
FIG. 4 is a side elevational view of the assembled base of the simulated telephone instrument shown in FIG. 3.

One embodiment of the construction, shown in FIGS. 1, 2 and 3, shows a simulated European type of telephone instrument, which is known as a "French" phone.

The telephone instrument shown in FIGS. 1, 2 and 3 comprises a hollow base 10, formed of sheet metal or other suitable material, the base being of substantially rectangular cross-section, a pair of relatively low steps 11, 12 of rectangular cross-section projecting outward from the base.

The central portion of the forward wall 14 of the base is moved back to form an angularly positioned central or auxiliary forward wall 16, as shown in FIG. 1, the auxiliary forward wall supporting a simulated dial 17, which is shown in FIGS. 1 and 2.

A base plate 18, having a flanged rim 19, 20 surrounding it is located at the lower end of the base 10, the rim flanges 19, 20 being fixedly attached by welding or other suitable means to the interior of the outer walls of the lower step 12 of the base as shown in FIG. 1.

As shown in FIG. 3, a simulated handset is supported by a central tubular standard 21, having a pair of arms 22, 23 extending outward therefrom, the arms being angularly positioned, and slightly elevated relative to the base, each of the arms 22, 23 having a vertical section 26, 27, integral with the outer end thereof and extending upward therefrom.

The central standard 21 is tubular of substantially circular cross-section, the upper end of the central standard having a ball end 28 integral therewith, the ball end supporting the two arms 22, 23 which are supported by the central standard.

The two arms 22, 23 extending outward from the base, and the vertical sections 26, 27 integral with the outer end of the arms, are also tubular and of substantially circular cross-section, the diameter of the vertical sections 26, 27 being substantially equal to that of the arms 22, 23.

As shown in FIGS. 3 and 4, each of the vertical sections 26, 27, has a V-shaped support section 29, 30 fixedly attached thereto, the V-shaped support section extending upward from a ball end 31, 32, which is integral with, or attached to the upper end of each vertical section 26, 27.

As shown in FIGS. 3 and 4, a hollow simulated bell 33, is located above the top wall of the base, the simulated bell being of circular cross-section, and having a sloping upper wall 34 integral therewith, the sloping upper wall having an opening therethrough, which is fitted to the central standard, thereby supporting the simulated bell 33.

Figures 5, 6:
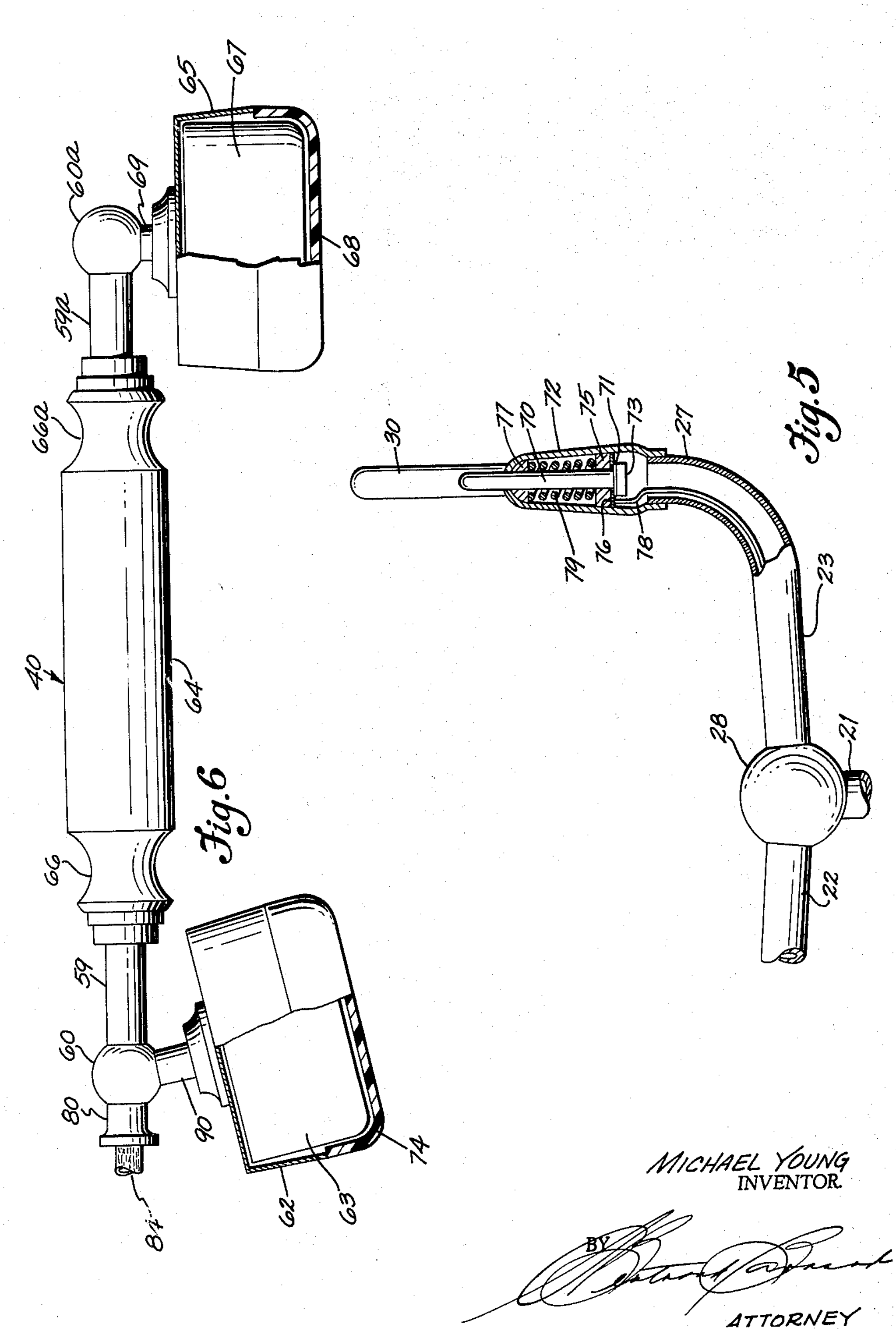
FIG. 5 is a partial front elevational view and partial longitudinal section through the handset support bracket, shown in FIGS. 3 and 4, the sectional portion being taken on the line 5—5, FIG. 4.
FIG. 6 is a front elevational view of the handset shown in FIG. 3, and a vertical section through the cylindrical ends of the handset, showing the speakers used in conjunction with the radio receiver shown in FIG. 1.

The handset shown in FIGS. 3 and 6 is removably supported by the V-shaped sections 29, 30 which are attached to the tubular vertical sections 26, 27 of the support member.

A transistorized radio receiver 35, of substantially rectangular cross-section, is fitted to the interior of the base, the radio receiver being supported by the bottom plate 18, which is attached to the base.

The radio receiver is the conventional type of portable or pocket radio receiver fitted with a plurality of transistors, the receiver having a built-in aerial, and being equipped with a plurality of dry cell batteries which enable it to operate without connection to an external voltage supply source.

A pair of spacer blocks 37, 37*a* supported by the bottom plate 18, is located between the bottom plate and the bottom of the case of the radio receiver.

A plurality of spring supports 38, 39 is located on opposite sides of the radio receiver to removably support the radio receiver relative to the bottom plate 18.

Each of the spring supports 38, 39 consists of a substantially flat lower flange 41, which is attached to the base plate by welding or other suitable means, a vertical section 42, which is connected to the lower flange by sloping intermediate section 43, and an upper flange 44, which is integral with the vertical section, the upper flange 44 which engages the top wall 45, of the case of the radio receiver, being operative to grip the top wall of the case of the receiver when the spring supports 38, 39 are in the position shown in FIG. 1, the vertical sections 42 of each of the spring supports 38, 39 engaging the adjacent wall of the outer case of the radio receiver.

Each of the upper flanges has a curved lip integral with the outer end thereof, the movement of the upper flange and the upper section, away from the outer case of the radio receiver, thereby allowing the receiver to be removed from the interior of the base 10 of the simulated telephone instrument.

As shown in FIG. 1, the sloping auxiliary forward wall has a circular opening therethrough, a tubular bushing 46, being fitted to the inner surface of the auxiliary forward wall, the bushing 46 which has a circular flange integral therewith, supporting a cylindrical dial support shaft 47, which is fitted thereto.

The dial support shaft 47, which supports the simulated dial, extends from a ball end connector 48, which is attached to a small cylindrical station selector shaft 49, which is incorporated with the radio receiver, and projects outward therefrom in the manner shown in FIG. 1.

A hollow cylindrical hub 50 is attached to the outer end of the station selector shaft 49, the outer wall of the hub having a ball end 51 integral therewith and connected thereto by a small cylindrical connecting section, which is located between the ball end 51 and the outer wall of the hub 50.

The ball end has an angularly positioned cylindrical pin 52 inserted therethrough, the ends of the pin projecting outward beyond the ball end in the manner shown in FIG. 1.

The inner end of the dial support shaft 47 has a hollow spherical segmental socket 53 integral therewith or attached thereto, the interior of the spherical segmental socket being fitted to the ball end 51.

The socket 53 has a plurality of radially positioned slots therethrough, the slots being operative to receive the projecting ends of the pin 52 thereby to control the rotation of the ball end 51 and therefore to select the stations in the radio receiver.

The outer end of the dial support shaft 47 has a reduced diameter section 54 integral therewith, as shown in FIG. 1.

The control dial 17 shown in FIG. 1, has a hollow central hub 55 integral therewith, the central hub being fitted to the reduced diameter section of the dial support shaft, thereby to support the dial 17.

The dial or knob, shown in FIGS. 1 and 2, has a plurality of equally-spaced, radially positioned circular depressions 58 therein, the depressions having the station letters, or identifying numerals painted or otherwise reproduced thereon, to indicate the momentary position of the dial, and therefore the station selected at a particular time.

An indicator arm 56 attached to the forward wall of the base extends from the forward wall of the base inward toward the face of the dial, the indicator arm having a narrow section 57 integral therewith, which is located over the forward face of the dial to indicate the position of the dial, and therefore the station selected at a particular time.

The dial has a plurality of serrations or scollops 61 around the outer circumference thereof, to facilitate rotation of the dial, and therefore the selection of the stations by means of the dial.

The handset 40 shown in FIG. 6, consists of a substantially cylindrical central section 64, with a pair of reduced diameter arcuate sections 66, 66*a* integral with the central section.

A hollow tubular connecting section 59, 59*a* is attached to and extends beyond each of the arcuate sections 66, 66*a*, a ball end 60, 60*a* being located at each end of each of the connecting sections.

A simulated mouthpiece or receiver is located at one end (left-hand), FIG. 6, of the handset, the simulated mouthpiece being supported by an angularly positioned tubular connecting section 90 which is angularly located relative to the axis of the central section 64 of the handset. The simulated mouthpiece end consists of a cupped hollow substantially cylindrical section 62, which is supported by the connecting section, a loud speaker 63, of substantially cylindrical form being fitted to the interior of the cupped cylindrical section. A cupped substantially cylindrical cap 74, is attached to the outer end of the cupped cylindrical section, the cap being threadably or otherwise fitted to the cylindrical section to facilitate removal of the cap 74 and therefore the speaker supported within the cylindrical section.

The cap 74 which is formed of a plastic or other suitable material has a plurality of openings, or perforations through the flat outer face thereof to facilitate the transmission of sound from the speaker.

The ball end 60*a* at the opposite end of the handset has a short tubular connecting section 69, attached thereto, the connecting section being substantially perpendicular to the central section 64 of the handset.

A simulated receiver is attached to the end of the connecting section 69, the simulated receiver consisting of a cupped substantially cylindrical section 65, which is similar to that shown at the left-hand end, the cupped section being attached to and supported by the connecting section 69. A loud speaker 67 is fitted to the interior of the cupped cylindrical section. A hollow cupped cylindrical cap 68, is attached to the outer end of the cylindrical section, in the same manner as that shown at the left-hand side, the cap being threadably or otherwise attached to an extension of the cylindrical section to cover the speaker, and facilitate removal of the speaker from the interior of the cylindrical section.

The flat outer face of each of the caps 74, 68, has a plurality of perforations therethrough to facilitate the transmission of sound from the speakers through the caps 74, 68.

In order to control the operation of the radio receiver by means of the handset 40, a switching mechanism, such as that shown in FIG. 5, is provided, the switching mechanism being mounted on one of the vertical sections 26, 27 of the bracket, which support the handset.

The switching mechanism shown in FIG. 5 includes a substantially cylindrical pin 70, which is slidably fitted to an extension of the tubular vertical section 27, the upper end of the pin 70 projecting through an opening through the spherical segmental upper end of a hollow tapered shell 72, shown in FIG. 5, which is fitted to the outer diameter of the right-hand vertical section 27, to replace the vertical section 26 shown at the left-hand side of FIG. 2.

The pin 70 has a cylindrical head 73 integral with the lower end thereof, the upper surface of the head having a contact 71 deposited thereon or otherwise attached thereto.

The upper end of the pin 70 may be of spherical segmental or other suitable form, as shown in FIG. 5, to facilitate operating the switching mechanism, when the upper end of the pin engages the reduced diameter arcuate section 66*a* of the handle of the handset.

A cylindrical, frusto-conical or other form of contact support 75, is fitted to the interior of the tapered outer wall of the tapered shell 72, shown in FIG. 5, the lower portion of the tapered shell 72 being split or having a slot therethrough to allow the contact support to be inserted therein.

Figure 7:
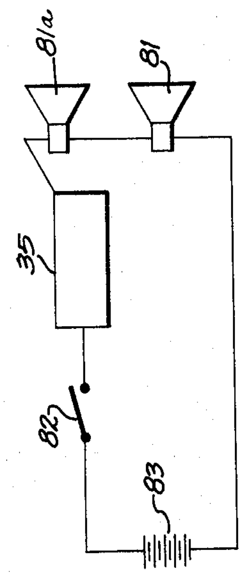
FIG. 7 is a schematic wiring diagram of the transistorized radio receiver shown in FIG. 1, showing the radio receiver, and the speakers electrically connected thereto.

A thin contact disc 76, is attached to the bottom surface of the contact support 75, the disc being made of a suitable contact material, such as copper, to close the circuit to the radio receiver in the manner shown in the wiring diagram shown in FIG. 7, when the contact 71 on the head of the pin 70 engages the contact disc 76 attached to the contact support located in the shell 72.

A wire 78 such as that shown in FIG. 5 is attached to the contact disc, the wire being operative to close the circuit to the radio receiver in the manner shown in FIG. 7, when the contact surface at the upper end of the head 73 of the pin, engages the contact disc 76 at the lower end of the contact support 75.

This is the position assumed by the pin 70 when the handset 40 is removed from the V-shaped support section 30, shown at the right-hand side of FIG. 3.

A vertical coiled compression spring 79 is fitted to the interior of the shell 72, the spring surrounding the cylindrical portion of the pin 70.

A spherical segmental disc 77 having an opening through the center thereof to receive the pin is fitted to the interior of the spherical segmental upper end of the shell, the flat face of the disc 77 engaging the upper edge of the spring 79. The spherical segmental disc is attached to the upper portion of the cylindrical pin by a pin or other suitable attaching means, to compress the spring 79, when the cylindrical pin 70 is moved downward by the handset.

The upper end of the pin 70 is of spherical segmental or other suitable contour, to facilitate engagement with one of the arcuate reduced diameter sections 66, 66*a* of the handset, when the handset is supported by the V-shaped support sections, in the normal position, shown in FIG. 3.

Thus when the handset is supported in its normal position, shown in FIG. 3, one of the reduced diameter arcuate sections of the central portion of the handset engages the upper end of the pin 70, thereby removing the head of the pin from engagement with the contact disc 76 attached to the contact support shown in FIG. 5.

When the handset is lifted from the V-shaped support sections 29, 30 of the bracket, the pin 70 is in the position shown in FIGS. 5, the contact surface of the upper end of the head of the pin engaging the contact disc 76, thereby closing the circuit to the radio receiver 35.

The outer right-hand end of the handset shown in FIG. 3, has a tubular extension 80, extending beyond the ball end 60 which supports the simulated receiver of the handset.

A flexible cord 84, which is fitted to the interior of the tubular extension, extends downward and is attached to the base 10 of the simulated telephone instrument, the flexible cord connecting the speakers which are fitted to the ends of the handset to the transistorized radio receiver, which is mounted in the base of the simulated telephone instrument.

FIG. 7 shows a schematic wiring circuit which is used for controlling the operation of the radio receiver shown in FIG. 1.

FIG. 7 shows a radio receiver 35 which is connected to a pair of speakers 81, 81*a*, such as those mounted in the cylindrical ends of the handset shown in FIG. 6.

The receiver is connected by a switch 82 to a battery 83, which may either be mounted in the interior of the radio receiver, or a separate battery or batteries, may be provided in the interior of the base 10 of the simulated telephone instrument, the battery supplying the voltage necessary to operate the radio receiver.

The switch 82 shown in FIG. 7, is the switching mechanism shown in FIG. 5, and hereinbefore described.

As shown in FIG. 1, a volume control shaft 85 is inserted through the vertical rear wall 86 of the base of the simulated telephone instrument, the opposite end of the shaft being inserted through the outer case of the radio receiver, to control the volume of the radio receiver.

A cylindrical or other form of knob 87 is integral with or attached to the outer end of the shaft 85 to allow the operator to manually control the volume of the radio receiver.

Each V-shaped section 29, 30 of the bracket which supports the handset 40, as shown in FIG. 4, includes an arcuate control section 91, which is inserted through and supported by the ball end 31 of the vertical sections 26, 27 of the bracket, or by the spherical segmental upper end of the tapered shell 72 shown in FIG. 5.

As shown in FIG. 4, a pair of outwardly sloping sections 88, 88*a*, is integral with the arcuate central section, the sloping sections extending outward, relative to the arcuate central section to support the reduced diameter arcuate portions 66, 66*a* of the handle portion of the handset.

The base 10 of the simulated telephone instrument may be as shown in FIGS. 1, 2 and 3, or it may be varied somewhat to suit the requirements of a particular installation.

The handset shown in FIGS. 3 and 6, may be constructed in the manner shown in FIG. 6, or it may be varied to some extent, the primary features being appearance and the fact that the cylindrical ends of the handset may be opened to allow a speaker to be inserted in each cylindrical end.

The central, or handle portion of the handset may be cylindrical, the arcuate reduced diameter ends thereof being varied to some extent, the primary feature being that both the reduced diameter ends must be constructed in such a manner that they rest on and are supported by the V-shaped sections 29, 30 of the bracket, which supports the handset, the reduced diameter arcuate ends being so constructed that one end engages the spherical segmental upper end or the cylidrical pin 70, thereby operating the switching mechanism shown in FIG. 5.

It will be apparent to those skilled in the art that the present invention is not limited to the specific details described above and shown in the drawings, and that various modifications are possible in carrying out the features of the invention and the operation, actuation, and the method of mounting and utilization thereof, without departing from the spirit and scope of the appended claims.

What is claimed is:

1. In combination with a simulated European type of telephone instrument having a hollow base of substantially rectangular cross-section, a handset support bracket supported by and extending upward from the base, a handset removably supported by the handset support bracket, a transistorized radio receiver mounted in the interior of the base of the simulated telephone instrument, a rotatable control dial mounted adjacent one wall of the base, means operatively connecting the control dial to the transistorized radio receiver, the handset of the simulated radio receiver having a pair of hollow substantially cylindrical heads attached adjacent the ends thereof, a speaker fitted to the interior of each of the cylindrical heads attached to the handset, a bottom plate attached to the bottom of the base, the transistorized radio receiver being supported by the bottom plate, means separating the radio receiver from the bottom plate, a plurality of formed plate springs attached to the bottom plate and extending upward therefrom, each of said plate springs including a flat lower flange attached to the bottom plate, an upper flange integral with each of the plate springs removably engaging the upper end of the radio receiver, means integral with each of the plate springs connecting the upper flange of each of the plate springs with the lower flanges thereof, and the upper flanges of the plate springs being operative to removably support the radio receiver.

2. In combination with a simulated European type of telephone instrument having a hollow base of substantially rectangular cross-section, a handset support bracket extending upward from the base and supported by the base, a handset removably supported by the handset support bracket, one wall of the base having a sloping section integral therewith, the sloping section sloping inward relative to the vertical axis of the base, a rotatable control dial mounted adjacent the sloping section of one wall of the base, means operatively connecting the control dial to the transistorized radio receiver, switching means fitted to the handset support bracket, means electrically connecting the switching means to the transistorized radio receiver, a portion of the switching means projecting upward through the portion of the handset support bracket, a portion of the handset being operative to engage the projecting portion of the switching means, to electrically control the operation of the radio receiver, a bottom plate attached to the bottom of the base of the telephone instrument, means separating the radio receiver from the bottom plate, a plurality of formed plate springs attached to the bottom plate and extending upward therefrom, the plate springs being operative to removably support the radio receiver, one wall of the radio receiver having a volume control shaft extending outward therefrom, a platform of the volume control shaft projecting through one wall of the base of the simulated telephone instrument, a knob attached to the projecting end of the volume control shaft, and the knob being operative to control the rotation of the volume control shaft.

References Cited by the Examiner

UNITED STATES PATENTS

| | | | |
|---|---|---|---|
| 1,622,335 | 3/1927 | Mitchell | 325—310 X |
| 2,826,644 | 3/1958 | Pease | 325—361 X |
| 2,895,044 | 7/1959 | Bowers | 325—352 X |

FOREIGN PATENTS

| | | |
|---|---|---|
| 1,337,652 | 8/1963 | France. |
| 229,355 | 2/1925 | Great Britain. |
| 73,242 | 9/1929 | Sweden. |

DAVID G. REDINBAUGH, *Primary Examiner.*

J. W. CALDWELL, *Assistant Examiner.*